Figures 1, 2:
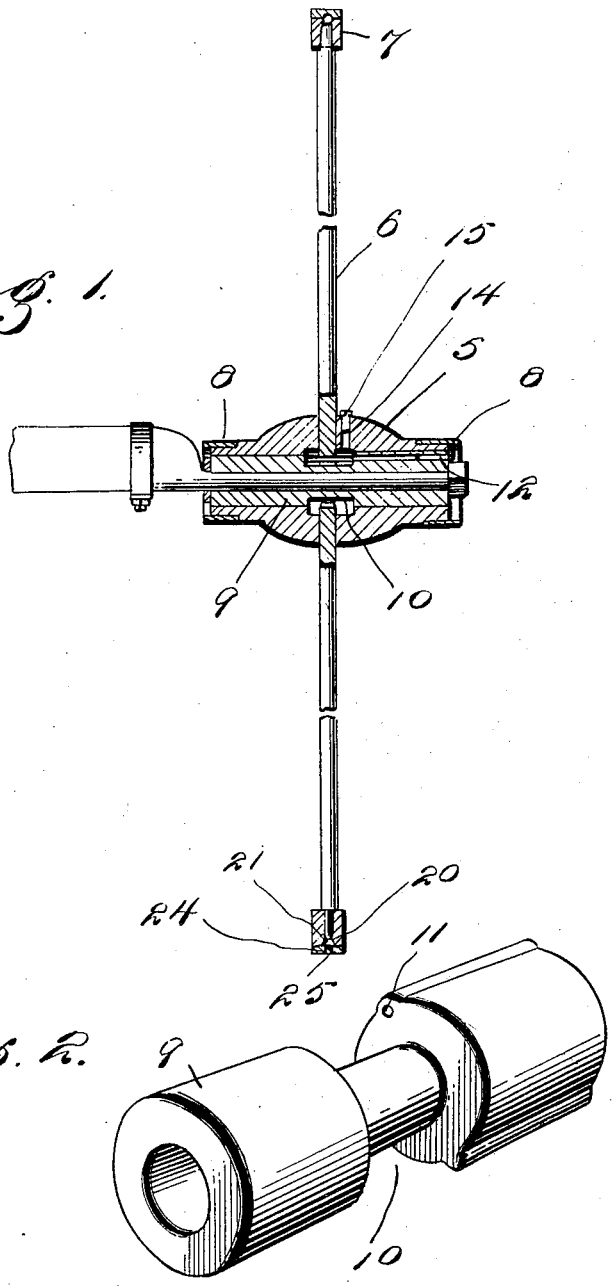

No. 768,889. PATENTED AUG. 30, 1904.
J. H. WHITE.
WHEEL.
APPLICATION FILED MAR. 30, 1904.
NO MODEL.

Witnesses
Inventor
J. H. White
Attorneys

No. 768,889. Patented August 30, 1904.

UNITED STATES PATENT OFFICE.

JAMES HENRY WHITE, OF SUNSET, TEXAS.

WHEEL.

SPECIFICATION forming part of Letters Patent No. 768,889, dated August 30, 1904.

Application filed March 30, 1904. Serial No. 200,784. (No model.)

*To all whom it may concern:*

Be it known that I, JAMES HENRY WHITE, a citizen of the United States, residing at Sunset, in the county of Montague, State of Texas, have invented certain new and useful Improvements in Wheels; and I do hereby declare the following to be a full, clear, and exact description of the invention, such as will enable others skilled in the art to which it appertains to make and use the same.

This invention relates to vehicle-wheels, and more particularly to that class made of wood, the object of the invention being to provide a construction which will permit of supplying oil to those parts that are liable to become loose as a result of shrinking from drying of the parts to prevent such drying and consequent loosening.

A further object of the invention is to provide a construction which will be simple and efficient and will not materially increase the cost of the wheel.

In the drawings forming a portion of this specification, and in which like numerals of reference indicate similar parts in the several views, Figure 1 is a section through a wheel in a plane including the axis of the wheel. Fig. 2 is a detail perspective view of the boxing of the hub.

Referring now to the drawings, the present wheel comprises a hub 5, in which are engaged spokes 6, which are engaged at their outer ends in the felly 7, said parts being of wood and the hub having at its ends the usual retaining-bands 8. Engaged in the hub is a metal boxing 9 of tubular form to receive the usual spindle on which the hub rotates, this boxing being provided with a circumferential groove 10, which lies in line with the spokes, so that the recesses in which the spokes are engaged will communicate with this groove when the boxing is in place. The end portions of the boxing fit the ends of the hub snugly to prevent leakage of any liquid that may be contributed to the chamber that is formed by the groove. The object of the chamber formed by the groove 10 is to hold oil, so as to wet the inner ends of the spokes 6 and prevent such shrinkage of the spokes as would cause them to loosen in the hub.

To provide for supplying oil or other liquid to the chamber, a passage 11 is formed longitudinally through one end of the boxing and through one end wall of the groove or chamber, and the liquid may be poured through this passage, after which the passage is closed by means of a screw or other style of plug 12. As an additional means for supplying liquid to the chamber a passage 14 is formed radially of the hub and communicates with the chamber, said passage having a suitable closure 15 for preventing egress of liquid. A liquid-holding chamber 20 is also formed in the periphery of the felly by forming a circumscribing groove or channel 21 therein, and in the inner face of the tire 22 is formed a groove or channel which registers with that in the periphery of the felly. The tire hugs the felly so closely as to prevent leakage of liquid therebetween, and oil or other liquid is supplied to the chamber 20 through an opening 24, formed in the tire and which is provided with a screw-plug 25, which lies flush with the face of the tire when the plug is in its seat. By this means both ends of the spokes are wetted, and loosening of the spokes in both the hub and felly is prevented.

It will be noted that the chamber in the hub extends part way into the wood of the hub, this being accomplished by forming a channel or groove in the inner face of the hub, it being understood, however, that either the hub or the boxing may be grooved, or both may be grooved, as preferred.

What is claimed is—

1. A wheel comprising a hub having a boxing therein, and having an oil-holding chamber between the boxing and the inner face of the hub and a filling-passage communicating therewith, a closure for the filling-passage, and spokes engaged in the hub with their inner ends exposed to the oil in the chamber.

2. A wheel comprising a hub, a felly, spokes engaged in the hub and felly, a boxing in the hub, a tire upon the felly, an oil-holding chamber in the hub between it and the boxing, an oil-holding chamber between the felly and the tire, the spokes having their inner and outer ends exposed respectively to the oil in the hub-chamber and the felly-chamber, said chambers having filling-passages leading thereto, and closures for the filling-passages.

In testimony whereof I affix my signature in presence of two witnesses.

JAMES HENRY WHITE.

Witnesses:
W. R. POTTER,
R. F. CRIM.